(12) United States Patent
Johnson et al.

(10) Patent No.: US 7,726,750 B2
(45) Date of Patent: Jun. 1, 2010

(54) LATCH FOR ENCLOSURE

(75) Inventors: Steven J. Johnson, Mahtomedi, MN (US); Johann Anthony Toikka, Andover, MN (US); Trent T. Jones, White Bear Lake, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 353 days.

(21) Appl. No.: 11/480,331

(22) Filed: Jun. 30, 2006

(65) Prior Publication Data

US 2008/0036344 A1 Feb. 14, 2008

(51) Int. Cl.
*E05C 7/06* (2006.01)

(52) U.S. Cl. ............ 312/217; 312/324; 312/287

(58) Field of Classification Search .......... 312/296, 312/216, 217, 220, 324, 325, 329, 287, 215; 292/340, 137, 145, 150, 302, DIG. 53, 152, 292/303; 109/19, 67, 68; 70/208, DIG. 65; 232/19, 43.1, 43.4, 44

See application file for complete search history.

(56) References Cited

U.S. PATENT DOCUMENTS

| | | | | |
|---|---|---|---|---|
| 1,458,200 A | * | 6/1923 | Sloan | 232/41 D |
| 1,478,552 A | * | 12/1923 | Chapman | 232/41 D |
| 1,544,604 A | * | 7/1925 | Scott | 200/293 |
| 1,603,404 A | * | 10/1926 | Proctor | 292/25 |
| 2,151,284 A | * | 3/1939 | Tinnerman | 292/17 |
| 2,185,161 A | * | 12/1939 | Tinnerman | 292/254 |
| 2,833,583 A | * | 5/1958 | Stone et al. | 292/340 |
| 2,895,761 A | * | 7/1959 | Kroll | 292/302 |
| 3,110,438 A | * | 11/1963 | Leckner | 232/43.4 |
| 3,174,193 A | * | 3/1965 | Smith | 49/68 |
| 3,175,873 A | * | 3/1965 | Blomquist et al. | 312/296 |
| 3,218,111 A | * | 11/1965 | Steiner | 312/405.1 |
| 3,346,291 A | * | 10/1967 | Massal | 292/144 |
| 3,602,536 A | * | 8/1971 | Gamble | 292/127 |
| 4,666,106 A | * | 5/1987 | Kohout | 244/129.3 |
| 4,669,767 A | * | 6/1987 | Leto | 292/259 R |
| 4,814,817 A | * | 3/1989 | Nishijima et al. | 399/125 |
| 4,913,476 A | * | 4/1990 | Cook | 292/196 |
| 4,974,888 A | * | 12/1990 | Childers | 292/251 |
| 4,993,247 A | * | 2/1991 | Minemura | 70/208 |
| 5,022,243 A | * | 6/1991 | Embry et al. | 70/34 |
| 5,106,251 A | * | 4/1992 | Steinbach | 411/433 |
| 5,160,180 A | * | 11/1992 | Mlynarczyk | 292/252 |
| 5,172,944 A | | 12/1992 | Munich et al. | |
| 5,193,862 A | * | 3/1993 | Oden | 292/50 |
| 5,481,889 A | | 1/1996 | Richard et al. | |
| 5,509,703 A | | 4/1996 | Lau et al. | |
| 5,630,632 A | | 5/1997 | Swan | |
| 5,642,909 A | | 7/1997 | Swan et al. | |
| D396,397 S | | 7/1998 | Swan | |

(Continued)

OTHER PUBLICATIONS

"DesignLine Double Hinged Instrument Enclosures;" Hoffman Engineering Company; 1990; pp. 286 and 287; Anoka, MN USA.

*Primary Examiner*—Janet M Wilkens
(74) *Attorney, Agent, or Firm*—Greenberg Traurig, LLC (57) ABSTRACT

An enclosure includes a back enclosure unit, a front enclosure unit hinged to the back enclosure unit, a rod coupled to the front enclosure unit, and a spring latch coupled to the back enclosure unit, wherein the rod engages the spring latch when the front enclosure unit is closed upon the back enclosure unit.

8 Claims, 7 Drawing Sheets

U.S. PATENT DOCUMENTS

| | | |
|---|---|---|
| D400,076 S | 10/1998 | Jancsek et al. |
| 5,879,035 A | 3/1999 | Jancsek et al. |
| 6,038,892 A * | 3/2000 | Schmitt .......................... 70/78 |
| 6,102,501 A * | 8/2000 | Chen et al. ................ 312/223.2 |
| 7,001,001 B1 * | 2/2006 | Spencer ...................... 312/219 |

* cited by examiner

LATCH FOR ENCLOSURE

FIELD OF THE INVENTION

This invention relates to the field of electrical enclosures, and more specifically to a latch for a double hinge enclosure.

BACKGROUND

Electrical enclosures can be used to house assorted electrical and datacom equipment. The enclosure protects the electrical equipment from the environment and helps prevent access to the equipment. A double hinge enclosure includes a back enclosure unit hinged to a front enclosure unit. The units are typically latched together using a manual means such as an outside latch which a user latches to hold the two enclosure units together. There is a need for an easier method of latching the two enclosure units.

SUMMARY

An enclosure includes a back enclosure unit, a front enclosure unit hinged to the back enclosure unit, a rod coupled to the front enclosure unit, and a spring latch coupled to the back enclosure unit. The rod engages the spring latch when the front enclosure unit is closed upon the back enclosure unit.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
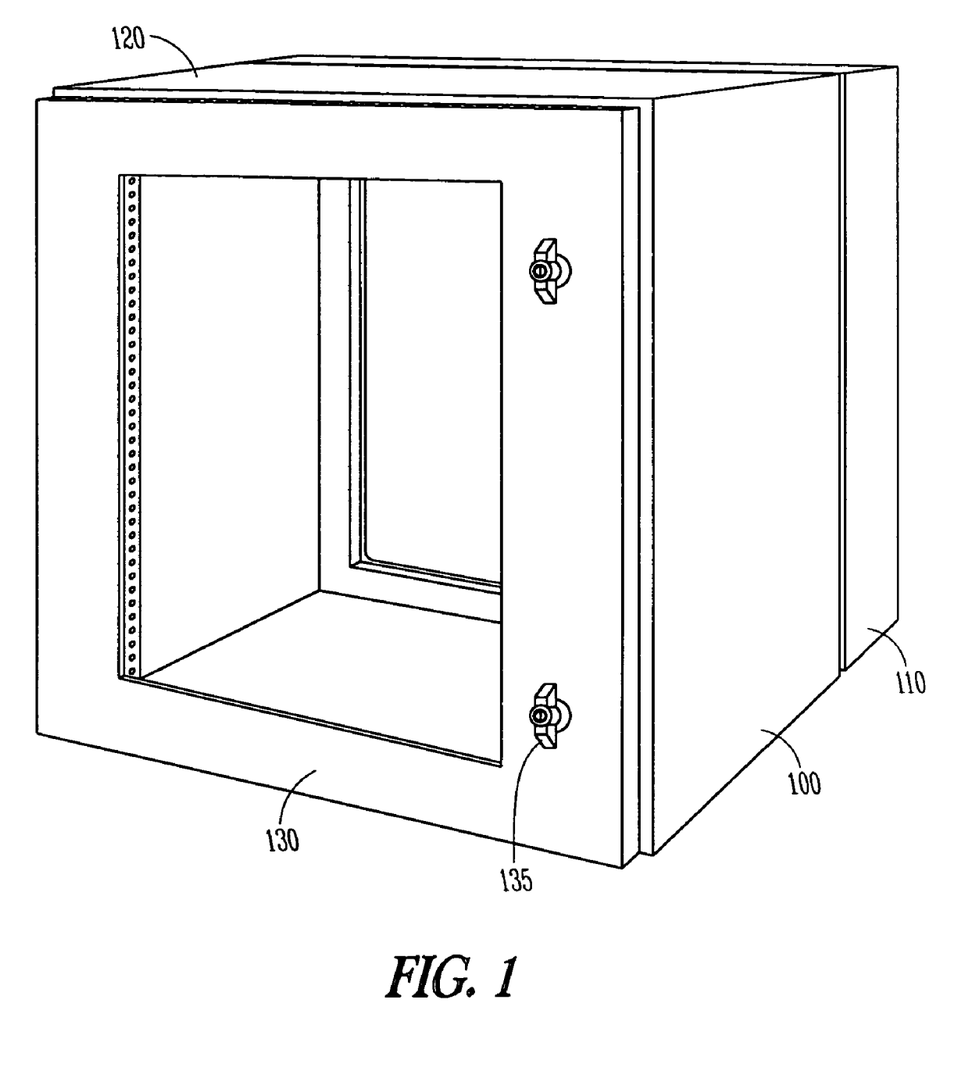
FIG. 1 shows a perspective view of an enclosure according to one embodiment.

FIG. 1 shows a perspective view of an enclosure 100 according to one embodiment. Enclosure 100 is a double hinge, wall-mount enclosure and includes a back enclosure unit 110, a front enclosure unit 120 hinged to back enclosure unit 110, and a front door 130 hinged to front enclosure unit 120. Front door 130 can include one or more rotatable latches 135 to hold the front door tightly closed against the front enclosure unit 120. Enclosure 100 can be used to house datacom equipment or other electrical equipment and devices.

Figure 2:
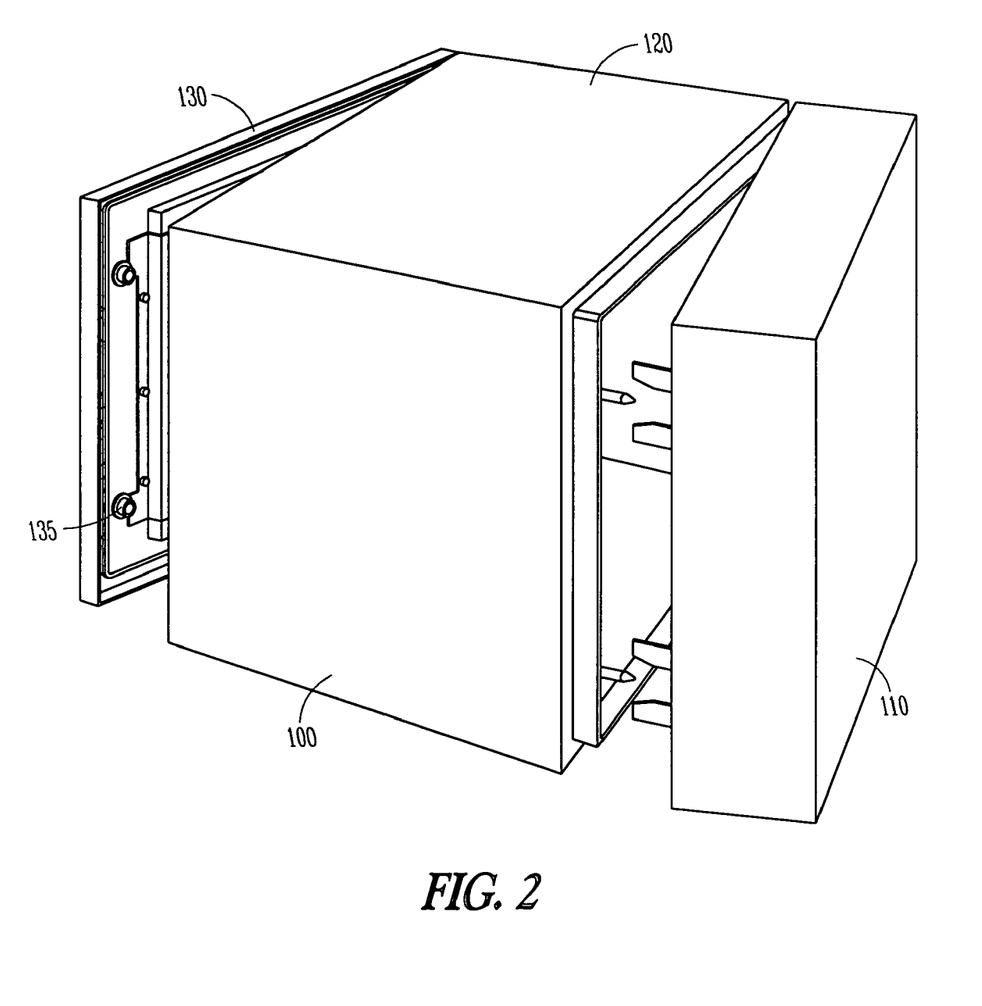
FIG. 2 shows a rear perspective view of the enclosure of FIG. 1.

FIG. 2 shows a rear perspective view of enclosure 100 with front enclosure unit 120 swung open from back enclosure unit 110 and front door 130 swung open from front enclosure unit 120. As will be discussed in detail below, enclosure 100 is configured to allow front enclosure unit 120 to be slam latched to back enclosure unit 110.

Figure 3:
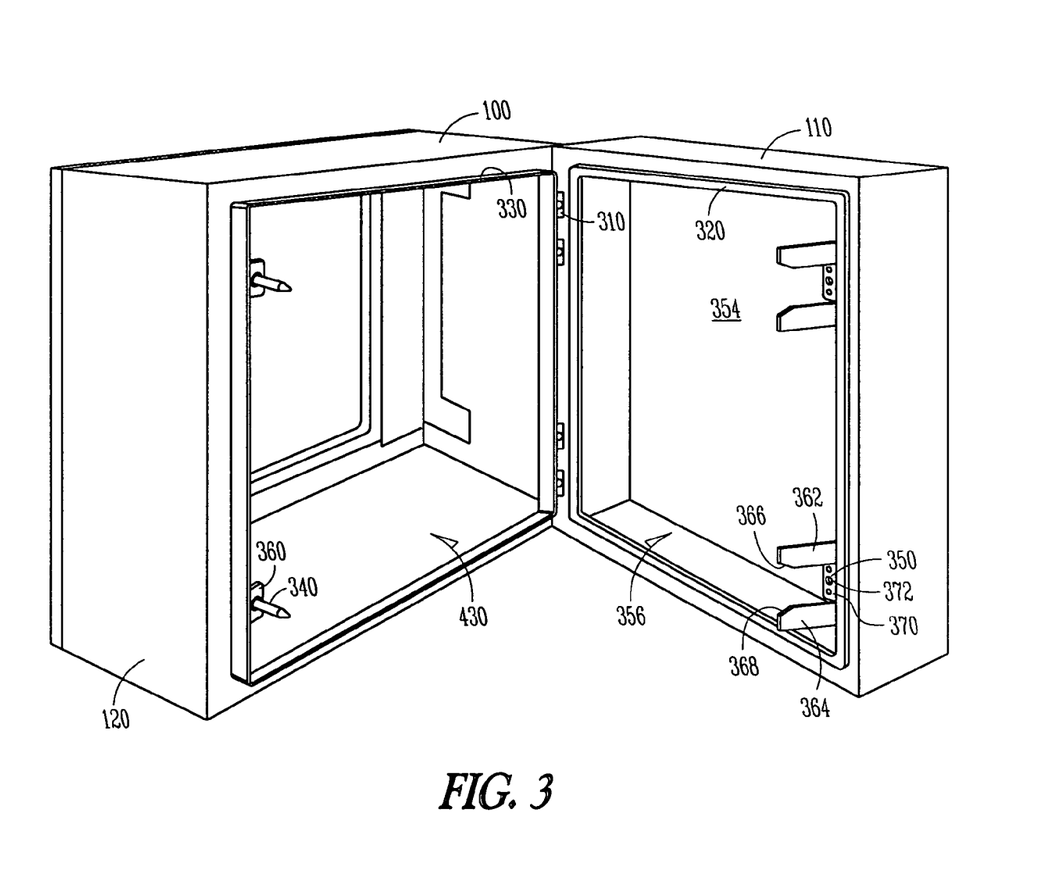
FIG. 3 shows a rear perspective view of the enclosure of FIG. 1.
Figure 4:
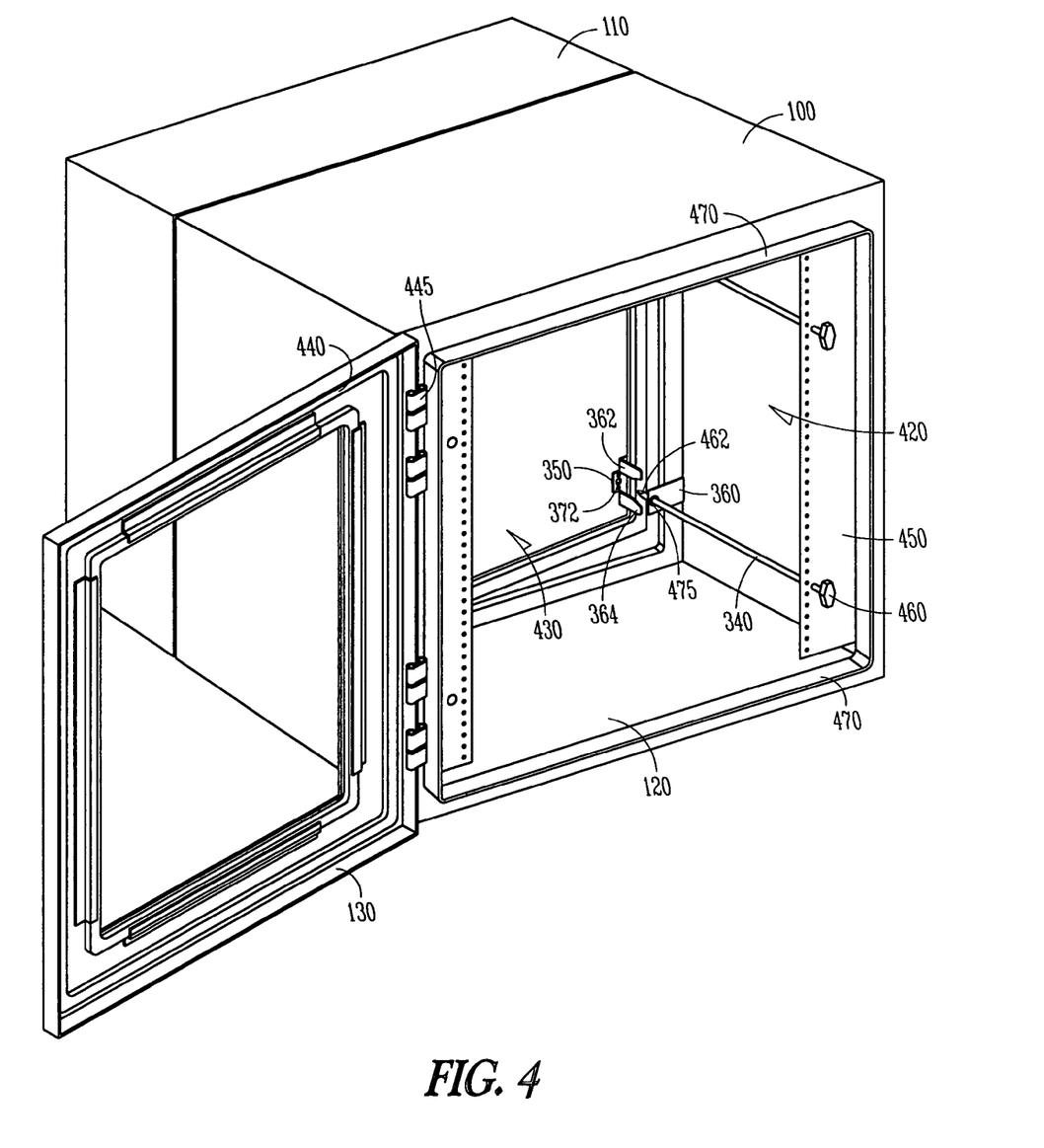
FIG. 4 shows a front perspective view of the enclosure of FIG. 1.

FIG. 3 shows a rear perspective view of enclosure 100 with front enclosure unit 120 open from back enclosure unit 110 and FIG. 4 shows a front perspective view of enclosure 100. Front enclosure unit 120 is connected to back enclosure unit 110 by one or more hinges 310. Back enclosure unit 110 includes a back wall 354, a top wall, a bottom wall, a first side wall, and a second side wall, and an open front side 356. The back enclosure unit 110 is adapted to be mounted against a wall such that back wall 354 is flush with the wall.

In one embodiment, a gasket material 320 can be mounted around a perimeter of the open front side 356. Front enclosure unit 120 includes an edge 330 that compresses the gasket material 320 to provide a seal when the front enclosure unit 120 is latched to the back enclosure unit 110. In other examples, the back enclosure unit 110 can include an edge and the front enclosure unit 120 could have the gasket material 320 mounted thereon. Gasket material 320 can include a compliant material or a foam material, for example.

To provide the slam-latching of the present system, a rod 340 is coupled internally within the front enclosure unit 120 and a spring latch 350 is coupled to the back enclosure unit 110. Rod 340 is aligned with the spring latch 350 and automatically engages the spring latch 350 when the front enclosure unit 120 is closed upon the back enclosure unit 110.

Rod 340 is held within front enclosure unit 120 by a front holder 450 and a rear holder 360. Rod 340 is rotatable within the holders 450, 360 but cannot move back and forth. Rod 340 extends from the front side of the front enclosure unit 120 through the open back side 430 of the front enclosure unit. Rod 340 includes a handle 460 on one end and a latching feature 462 on a second end. Rod 340 can be either completely rotatable or can be spring loaded so as to return to a predetermined position, as will be discussed below. One or more clips 475 can be located at the front and back holders 360, 450 to hold the rod in place.

Spring latch 350 is mounted to back enclosure unit 110 at a mounting bracket 370. Mounting bracket 370 includes a hole 372 and the spring latch 350 is mounted on the back side of mounting bracket 370 and aligned with hole 372. The tip of rod 340 extends through hole 372 to engage the spring latch 350 when the front enclosure unit is closed upon the back enclosure unit 110.

Also extending from mounting bracket 370 are alignment features 362 and 364. Alignment features 362 and 364 are configured to help align the front enclosure unit and the back enclosure unit 110. Front enclosure unit 120 includes corresponding alignment features including holder 360. Holder 360 is dimensioned such that its top and bottom surfaces can contact top and bottom camming surfaces 366, 368 of the alignment features 362, 364. Accordingly, surfaces 362 and 364 work with the alignment features of holder 360 to align the two enclosure units. This provides further alignment to allow the rod 340 to meet the spring latch 350 correctly. Furthermore, holder 360 can rest on alignment feature 364 for load support and top alignment feature 362 can rest upon holder 360 so that it also provides load support.

Referring also to FIG. 4, front enclosure unit 120 includes a top wall, a bottom wall, a first side wall and a second side wall, an open front side 420 and an open back side 430. Front enclosure unit 120 is configured with the back enclosure unit 110 such that the open back side 430 of the front enclosure unit closes over and communicates with the open front side 356 of the back enclosure unit.

Front door 130 is hinged to the front enclosure unit 120 by a hinge 445 and is located so as to cover the open front side 420 of the front enclosure unit. Gaskets 440 can be placed on the front door so as to seal the units when closed by squeezing against an edge 470 on the front side of front enclosure unit 120. Front door 130 encapsulates and covers the unit so no access is provided. Since the rods are inside the secured enclosure (behind the key-locked or tool-locked door 130) the rods 340 can typically only be activated from the front of the enclosure after opening the door. This allows the enclosure 100 to be placed in areas with restricted access to the sides, such as up against a side wall.

Figure 5:
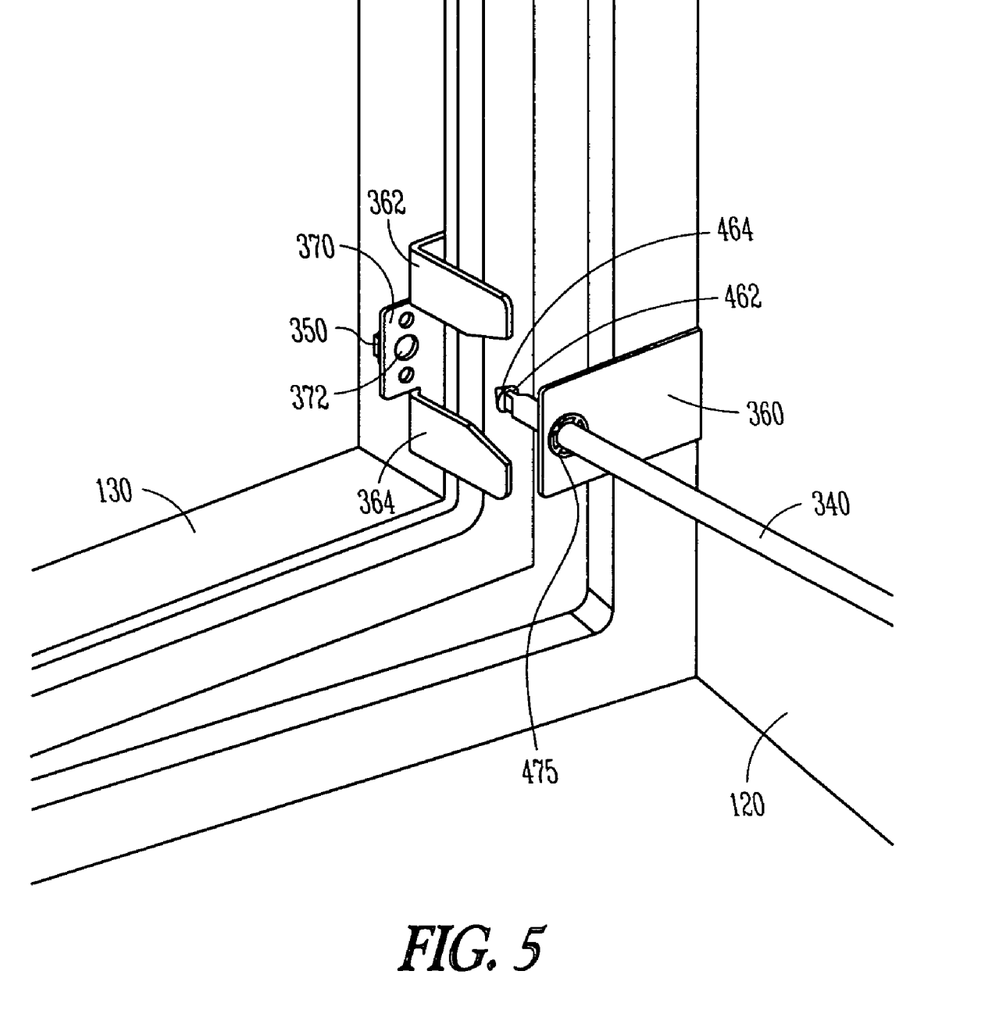
FIG. 5 shows details of a latching system of the enclosure of FIG. 1.

As can be seen in FIG. 5, latching feature 462 includes a ridge 464 along at least one side of rod 340. As discussed, rod 340 is aligned with the spring latch 350 and the latching feature 462 engages the spring latch 350 when the front enclosure unit is closed upon the back enclosure unit. This happens automatically when the front enclosure unit 120 is slammed (forcefully closed) upon the back enclosure unit 110. To disengage the latch, rod 340 is rotated a quarter turn and the latching feature 462 disengages from the spring latch 350. This allows for a quick closing slam-action latching and an automatic latching with no further manual operation by the user. It is automatic and provides the right compression pressure against the gaskets.

Figure 6:
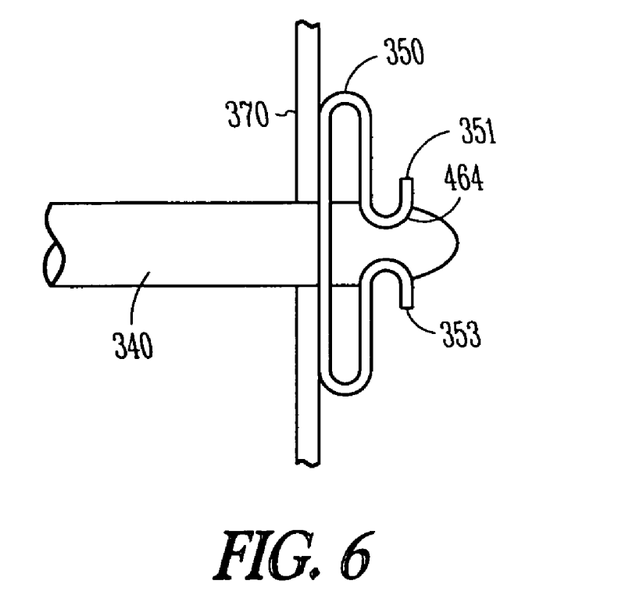
FIG. 6 shows a top view of a latching system of the enclosure of FIG. 1.
Figure 7:
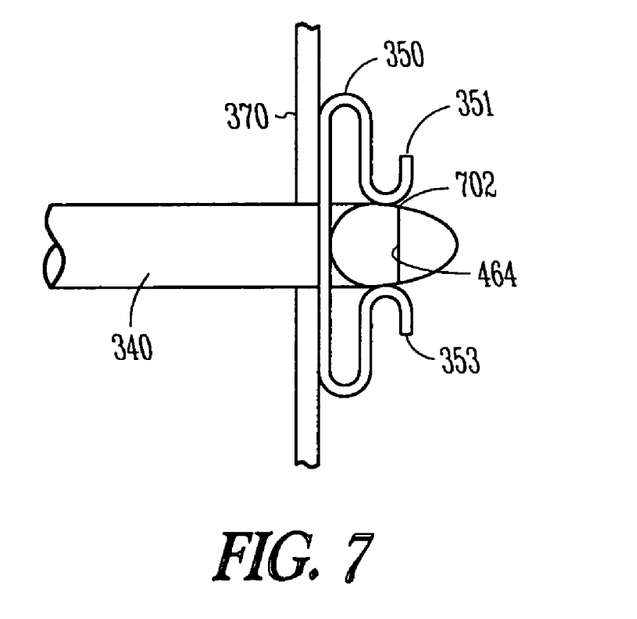
FIG. 7 shows another top view of the latching system of the enclosure of FIG. 1.

FIGS. 6 and 7 show further details of latching and unlatching the enclosure unit. In one embodiment, spring latch 350 includes a pair of arms 351, 352 that are biased towards each other. As rod 340 enters the spring latch 350, the arms spread and then come together at edge 464 to hold the rod in place. To open the latch, the rod 340 is turned a quarter turn (See FIG. 7), such that the outer surface 702 spreads arms 351 and 352 apart so that the rod can be pulled away from spring latch 350.

Figure 8:
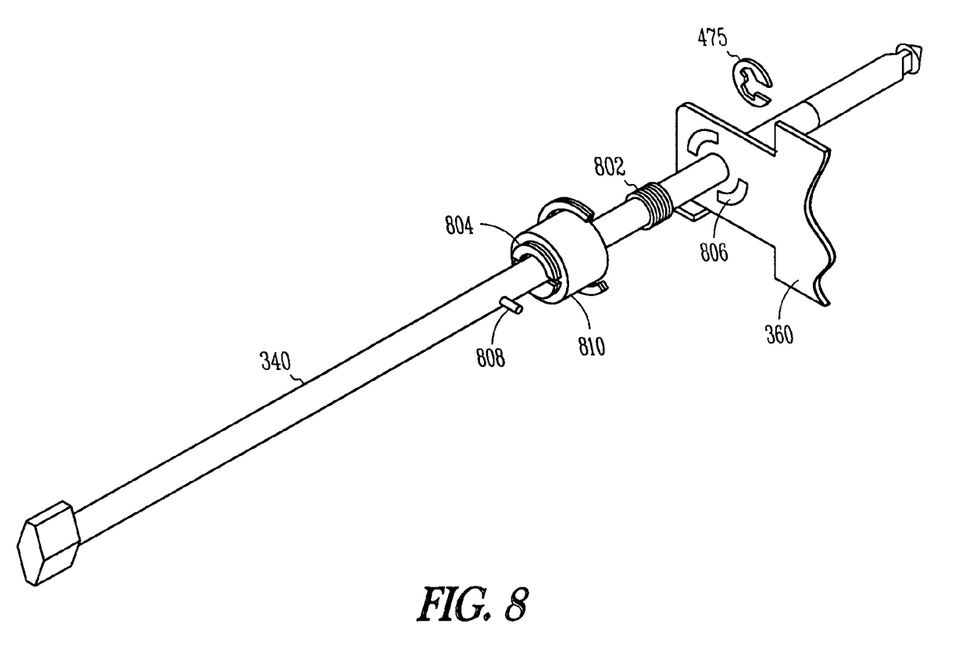
FIG. 8 shows an exploded view of a rod assembly, in accordance with one embodiment.

FIG. 8 shows an exploded view of a rod assembly, in accordance with one embodiment. In this example, rod 340 is spring-loaded so as to automatically return to a locking position. Thus, after rod 340 is turned to open the latch (see FIG. 7), the rod will automatically return to the proper closing orientation. In one embodiment, the spring-loaded assembly includes a spring 802 encircling rod 340. One end of spring 802 couples to a notch 806 in holder 360 and another end of spring 802 couples to a base 804 that also encircles rod 340. A protrusion 808 on rod 340 engages a cut-out 810 on base 810. Thus, after the rod 340 is turned a quarter-turn, spring 802 drives base 804 and rod 340 back to the original position.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An enclosure comprising:
   a back enclosure unit including an open front side, the back enclosure unit adapted to be mounted against a wall;
   a front enclosure unit hinged to the back enclosure unit, the front enclosure unit including an open front side and an open back side, the front enclosure unit configured with the back enclosure unit such that the open back side of the front enclosure unit closes over the open front side of the back enclosure unit;
   a front door hinged to the front enclosure unit and located so as to cover the open front side of the front enclosure unit;
   a spring latch coupled to the back enclosure unit; and
   a rod coupled to the front enclosure unit, the rod rotatable relative to the spring latch, the rod extending from the front side of the front enclosure unit through the open back side of the front enclosure unit, the rod including a handle on one end and a latching feature on a second end, the latching feature including a ridge along a side of the rod, wherein the latching feature engages the spring latch when the front enclosure unit is closed upon the back enclosure unit.

2. The enclosure of claim 1, wherein when the rod is rotated a quarter turn, the latching feature disengages from the spring latch.

3. The enclosure of claim 1, further including an alignment feature on the back enclosure unit and a mating alignment feature on the front enclosure unit.

4. The enclosure of claim 1, including a gasket material on at least one of the front or back enclosure units.

5. The enclosure of claim 1, wherein the spring latch includes at least two arms biased towards each other.

6. The enclosure of claim 1, wherein the rod is internally mounted within the front enclosure unit.

7. The enclosure of claim 1, wherein the rod and spring latch are adapted to automatically latch upon the closing of the front enclosure unit on the back enclosure unit.

8. The enclosure of claim 1, further including a spring assembly to return the rod to the rod's original orientation after being rotated.

* * * * *